United States Patent [19]

Müller

[11] 4,231,991
[45] Nov. 4, 1980

[54] APPARATUS FOR CRYSTALLIZING AN AMORPHOUS PARTICULATE MATERIAL

[75] Inventor: Dieter Müller, Sickte, Fed. Rep. of Germany

[73] Assignee: Buehler-Miag GmbH, Brunswick, Fed. Rep. of Germany

[21] Appl. No.: 833,335

[22] Filed: Sep. 14, 1977

[30] Foreign Application Priority Data

Sep. 18, 1976 [DE] Fed. Rep. of Germany ....... 2642102

[51] Int. Cl.³ .............................................. B01D 9/00
[52] U.S. Cl. ................................... 422/245; 260/707; 528/483; 528/503
[58] Field of Search ............... 422/245, 254, 131, 134, 422/135, 138, 205, 225; 528/503, 483; 34/168; 241/65; 23/295 R; 260/707, DIG. 35; 159/45, DIG. 10

[56] References Cited

U.S. PATENT DOCUMENTS

| 2,458,412 | 1/1949 | Payne | 34/168 |
| 3,450,183 | 6/1969 | Hinton | 422/134 |
| 3,544,525 | 12/1970 | Balint et al. | 264/143 |
| 3,547,890 | 12/1970 | Yamada et al. | 422/135 |
| 3,595,625 | 7/1971 | Bruce | 159/45 |
| 3,661,330 | 5/1972 | Yamada et al. | 422/245 |

*Primary Examiner*—Hiram H. Bernstein
*Attorney, Agent, or Firm*—Michael J. Striker

[57] ABSTRACT

Apparatus for crystallizing an amorphous material which is in granular form involves admitting the granular synthetic resin into a vertical crystallization zone and permitting the granular resin to descend through this zone under the influence of gravity. A counterflow of hot gas is passed through the descending granular resin and heats the latter to a temperature at which it transforms from an amorphous to a crystalline state. Once the granular resin has passed through the crystallization zone, it is subjected to abrasion for the purpose of separating crystalline particles which adhere to one another. An apparatus for carrying out the method includes a vertical vessel which extends outwardly and downwardly and which may be of rectangular or circular cross-section. An inlet for granular material and an outlet for spent gas are provided at the top of the vessel. An outlet for the crystallized material and an inlet for hot gas are provided at the bottom of the vessel. Baffles may be provided for distributing the hot gas evenly over the cross-section of the vessel. The vessel has a crystallization zone. Between this zone and the bottom of the vessel there is arranged a device for subjecting the crystallized material to abrasion. This device may be in the form of a plate mounted for reciprocating movement and provided with apertures of a size equal to the maximum particle size of the crystallized material. A shaft dryer may be arranged below the crystallization vessel to adjust the moisture content of the crystallized material to a desired value. The apparatus makes it possible to continuously crystallize granular synthetic resin at a high throughput and in an economical manner.

3 Claims, 2 Drawing Figures

APPARATUS FOR CRYSTALLIZING AN AMORPHOUS PARTICULATE MATERIAL

BACKGROUND OF THE INVENTION

The invention relates generally to an apparatus for treating particulate materials.

More particularly, the invention relates to an apparatus for crystallizing particulate materials.

A more specific aspect of the invention deals with a apparatus for crystallizing granular synthetic resins, especially granular polyesters.

Methods for the crystallization of granular synthetic resins operate primarily with so-called fluidizing heaters or fluidizing dryers. These heaters or dryers are pot-shaped vessels equipped with special inserts or stirrers. The granular resin is admitted into such a vessel in discontinuous batches and is subjected to an upwardly directed stream of hot gas. The gas stream forms a fluidized bed of the granular resin which is held in a freely suspended state while simultaneously, being subjected to a whirling motion, for a period of time. As a result of this treatment, which involves heating the granular resin to its transition temperature, the resin transforms from the amorphous or non-crystalline state to the crystalline state. The whirling motion imparted to the resin particles with the aid of the inserts and the stream of hot gas prevents the particles from adhering to one another.

The known apparatus of this type such as disclosed, for example, in the French Pat. No. 1,352,614 and the German Pat. No. 2,155,785, exhibit certain disadvantages. They use large amounts of energy and, as a result of this and the costly inserts provided therein, require large expenditures. A further disadvantage resides in that the crystallization process is discontinuous.

Continuous crystallization processes are known from French Pat. No. 1,478,224 and German Offenlegungsschrift No. 1,779,521. One of these processes operates with a fluidizing arrangement whereas the other operates by passing the material through the crystallization zone in compact bulk form under the influence of gravity and subjecting the material to stirring. However, these processes, as well as the corresponding apparatus, exhibit the common disadvantage of being suitable only for granulated products such as, for example, the so-called granular band or strand materials, which have relatively little tendency to form clumps or aggregates by adhesion of the particles to one another. The reason that granular materials of this type, which in the main consist of particles of parallelepiped form, have little tendency to form clumps stems from the fact that the manufacturing process for these granular materials causes the rate of primary crystallization at the sectional planes and the outer surfaces of the particles to be different. Thus, a tendency for the particles to bake together, or to adhere to one another, exists only for a single orientation and thereby reduces the tendency for clump formation. Furthermore, even this reduced tendency for clump formation may be limited by suitable selection of the temperature or may be eliminated by the use of stirrers.

German Offenlegungsschrift No. 1,779,521 discloses mechanical means in the form of rollers provided with pins for breaking up clumps of particles. However, this type of mechanical means was intended for use only with the type of granular material just described, namely, a granular material having little tendency to form clumps. In fact, mechanical means such as described in the German Offenlegungsschrift No. 1,779,521 have heretofore been used only under abnormal conditions, e.g. incorrect temperatures, breaking of stirring paddles, etc., and consequently have found utilization only in exceptional cases for breaking up small blocks or clumps of granular band or strand materials.

These latter types of granular materials are gradually being replaced by so-called underwater granular materials. These are granular materials which are produced by making strands of cylindrical cross-section from a melt and then cutting the strands underwater while still in the plastic state. Products of the type which are granulated underwater are much preferred inasmuch as energy consumption and surface area requirements are substantially smaller than are those for granular band or strand materials. However, by virtue of the shape of the particles of this underwater granular material, as well as by virtue of a very low and a very uniform rate of primary crystallization, there exists an extremely pronounced binding tendency in all orientations. In other words, an extensive baking together or adhesion of the particles of the granular material occurs in all directions upon heating. As a result, all of the known crystallization processes which operate with stirring or fluidizing arrangements become completely ineffective after only a short period of time.

SUMMARY OF THE INVENTION

It is an object of the invention to provide a method and an apparatus which make it possible to effectively crystallize even particulate materials which exhibit a pronounced binding tendency.

Another object of the invention is to provide a method and an apparatus which make it possible to reliably crystallize particulate materials in a continuous fashion even when the particles exhibit a pronounced tendency to adhere to one another.

A further object of the invention is to provide a method and an apparatus which allows particulate materials to be continuously crystallized at high throughput and at a low cost, in energy cost and equipment maintenance even when the materials have a pronounced binding tendency.

These objects, as well as others which will become apparent as the description proceeds, are achieved in accordance with the invention.

One aspect of the invention resides in a method of crystallizing particulate substances. The method involves crystallizing a quantity of particulate, substantially non-crystalline material under conditions such that the resulting crystalline particles form clumps or aggregates. At least some of the clumps are broken down, after completion of crystallization.

The invention will be described herein primarily with reference to the crystallization of granular synthetic resins, e.g. granular polyesters, although this is not intended to limit the invention.

In a preferred embodiment, the invention relates to a method and an apparatus for the crystallization of granular synthetic resins by passing a granular resin through a crystallization chamber in the presence of a hot gas counterflow and mechanically breaking down clumps which form from baking of the crystalline particles together or from adhesion of the particles to one another. The objects of the invention are here achieved in that the resin particles are permitted to pass through the crystallization zone under essentially no influence but that of gravity. The resin particles form a column in the crystallization zone and clumps form over the entire cross-section of the column. According to the invention, the clumps in a given cross-sectional plane of the column are subjected to the mechanical breakdown process together.

In contrast to the known methods, no mechanical or pneumatic break-down of the clumps occurs in the crystallization zone. Rather, the granular resin moves continuously through the crystallization zone solely under the influence of gravity while being heated by the stream of hot gas and thereby being crystallized. It will be understood that such passage does not negate the possibility of the particles being heated by a flowing gas so long as the gas does not preclude a substantial formation of clumps caused by adhesion of the particles to each other. In fact, according to the invention, the formation of clumps in the crystallization zone when the particles have transformed to the critical crystalline state is deliberately encruraged. The descending column of granular resin, develops clumps evenly over substantially its entire cross-section. These clumps can then be broken up into individual particles in an advantageous manner once adequate crystallization has occurred. As a result, a satisfactory, pourable granular resin is obtained at the end of the crystallization process.

Another aspect of the invention resides in an apparatus for crystallizing particulate substances. The apparatus utilizes means defining a crystallization chamber having a crystallization zone, and an abrasive device downstream of the zone for breaking down clumps of crystalline particles formed therein. The abrasive device includes at least one movable, grate-like grinding or frictional element.

The apparatus in accordance with the invention is well-suited for carrying out a method according to the invention.

According to one embodiment of the invention, the crystallization chamber has a vertical orientation and is provided with a material inlet, as well as a gas outlet, at the upper end thereof. The crystallization chamber is further provided with a material outlet and a hot gas inlet at the lower end thereof. The abrasive device for mechanically breaking down clumps of particles is located beneath the crystallization zone.

A simply constructed and reliably operated embodiment of the invention which uses a grinding element in the form of a plate provided with a plurality of perforations. Here, the grinding element might, for example, be shaped like a perforate tray, a grid or a similar element. The plate is mounted for translational motion. It is particularly advantageous when two such perforate plates are arranged one above the other and are separated by a distance corresponding to the largest allowable dimension of the resin particles. If the plates are relatively movable by driving of the upper plate, an optimal breakdown may be obtained.

In order to achieve uniform crystallization, it is important that the resin particles be evenly distributed over the cross-section of the crystallization zone, and be equally exposed to impinged by the hot gas. This is achieved by arranging a distribution device, or distribution devices, below the abrasive device in order to distribute the stream of hot gas evenly over the entire cross-section of the crystallization zone. The distribution devices are advantageously in the form of hollow, profiled members having the configuration of a ridged or saddled roof, or of an inverted cone, and are connected to an inlet conduit for the hot gas.

The crystallization chamber should be designed so that the granular resin can readily travel through it. To this end, another feature of the invention resides in constructing the crystallization chamber such that the cross-section thereof progressively increases from the top of the chamber to the abrasive device.

In order to remove the crystalline granular resin from the crystallization chamber, the latter is advantageously provided with a funnel-like material outlet. The material outlet opens into a conveyor which also serves as a seal for the crystallization chamber. The conveyor may, for example, be in the form of a bucket wheel valve.

A dryer such as, for instance, a shaft dryer, may be arranged immediately downstream of the crystallization chamber in order to adjust the moisture content of the crystalline granular resin a desired final value. In this case, it is preferable to provide the crystallization chamber with a material outlet which is in the form of a connecting piece having a constant cross-section. The connecting piece may simultaneously serve as a material inlet for the dryer which immediately follows the crystallization chamber.

Crystallization apparatus of the type under consideration here is normally designed to operate at its full capacity. In practice, however, such apparatus is often operated at only a fraction of such capacity. Consequently, the apparatus should additionally be capable of operating satisfactorily production levels as low as perhaps 20% of their rated capacity. However at less than full capacity the amount of amorphous granular resin fed to the crystallization apparatus per unit time is only a fraction of that which is fed at full capacity. Since this fraction of the granular resin is, however, subjected to a quantity of hot gas, corresponding to full capacity operation, the resulting excess of hot gas causes premature crystallization of the granular resin and upward displacement of the crystallization zone within the crystallization chamber. This may block the material inlet of the crystallization chamber with clumps which detrimentally affect the feeding of material into the chamber.

Accordingly, an important additional object of the invention is to provide a crystallization apparatus which enables the upward displacement of this crystallization zone its resultant crystallization at reduced production levels to be avoided.

To achieve this object, the invention exposes the resin particles to a cooling gas in the upper region of the crystallization chamber, to thereby limit heating of their particles to a temperature below the glass point. In this manner, premature clumping of the resin particles in the upper region of the crystallization chamber may be prevented. In order to uniformly distribute the cooling gas over the entire cross-section of the crystallization chamber, the invention further provides the crystallization chamber with a distribution device, or distribution devices, for the cooling gas. The distribution devices are arranged above the crystallization zone in the crystallization chamber. The distribution devices for the cooling gas may be the same as those used for the hot gas and may, for instance, be in the form of hollow, profiled members connected to a supply conduit for the cooling gas and having the configuration of a ridged or saddle roof, or of an inverted cone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
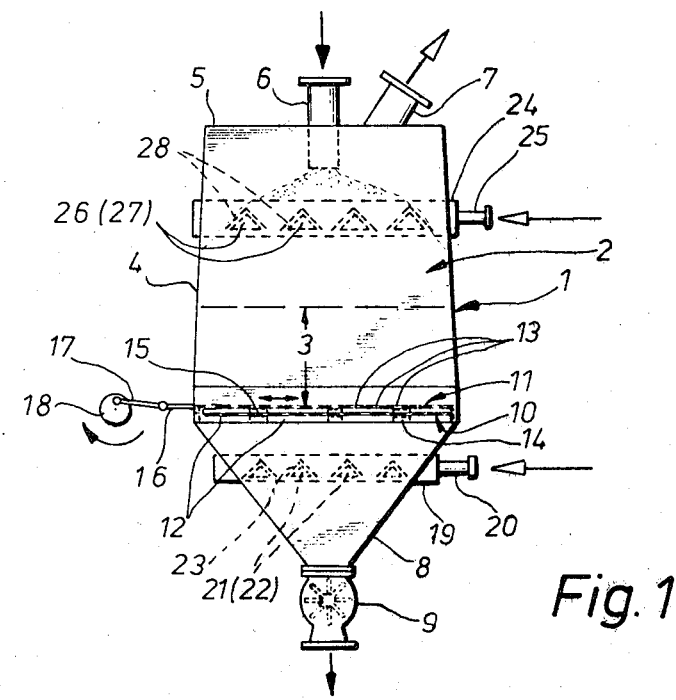
FIG. 1 schematically illustrates an embodiment of the crystallization apparatus according to the invention which is constructed as an independent unit and is provided with an outlet conveyor for the removal of material therefrom.

FIG. 1 illustrates one embodiment of a crystallization apparatus in accordance with the invention. The crystallization apparatus includes a housing 1 which surrounds and defines a crystallization chamber 2 having a crystallization zone of a length indicated by the split, double-headed arrow 3. The chamber 2 is arranged so that material to be crystallized, e.g. granular polyester, travels through the chamber from top to bottom whereas a hot gas such as hot air, flows through the chamber from bottom to top in order to heat the material to crystallizing temperatures. The housing 1 has a polygonal, e.g. square, cross-section.

The housing 1 has side walls 4 which are inclined to the vertical so that the width of the chamber 2 increases from the distance from its top. The housing 1 further has a top wall or cover 5 which is provided with a feed pipe 6 for the granular resin to undergo crystallization. The top wall 5 is also provided with an exhaust pipe 7 for the hot gas. The lower end of the housing 1 has a funnel-like section 8 which functions as an outlet for the granular resin after crystallization. A bucket wheel valve 9 is connected with the material outlet 8 and serves to convey the crystallized material out of the housing 1. The bucket wheel valve 9 also serves as a seal for the housing 1.

The crystallization chamber 2 and thus the crystallization zone 3 are bounded from below by an abrasive or grinding device. The abrasive device uses two juxtaposed grate-like elements which may, for example, as illustrated here, be in the form of plates 10 and 11 provided with a plurality of perforations. The perforations in the plate 10 are identified by the reference numeral 12 whereas the perforations in the plate 11 are identified by the reference numeral 13. The perforations 12 and 13 are of equal diameters on the order of 30 millimeters. The lower perforate plate 10 is stationarily mounted on profiled supports 14 which are fixedly secured to the walls 4 of the housing 1. The upper perforate plate 11 rests on profiled supports 15 and is slidable on the latter. The plate 10 and 11 are separated by a space which is somewhat larger than the largest dimension of the granular resin to be treated. The plate 11 is fixedly connected with a rod 16 which sealingly extends through a wall 4 of the housing 1. The rod 16 couples the plate 11 to a conventional eccentric drive which includes an eccentric lever 17, an eccentric disc or cam 18 and a non-illustrated motor. The eccentric drive moves the plate 11 back and forth in the direction indicated by the solid double-headed arrow. The stroke of the plate 11 may be on the order of 20 millimeters.

A supply casing 19 for feeding hot gas into the housing 1 is welded to the outside of the material outlet 8 below the level of the plates 10 and 11. The casing 19 is provided with connecting devices 20 through which it is in communication with a non-illustrated source of hot gas. The source of hot gas may, for instance, include a blower, and a radiator or other source of heat downstream of the blower in the direction of the gas flow.

The wall of the material outlet 8 which contacts the casing 19 is provided with triangular openings 21. On the other hand, the casing 19 is provided with triangular openings 22 adjacent the material outlet 8. The openings 21 in the material outlet 8 register with the openings 22 in the casing 19 and, in this fashion, communication is established between the casing 19 and the interior of the material outlet 8. Each of the openings 21 is arranged below a hollow, profiled member 23 having the configuration of a ridged or saddled roof. The profiled members 23 extend from the wall of the material outlet 8 which is provided with the openings 21 to the opposite wall of the material outlet 8 and are secured to these walls. The profiled members 23 function as distributors to distribute the hot gas uniformly over the entire cross-section of the crystallization chamber 2.

A supply casing 24 for feeding cooling gas, e.g. air at about 20° C. or room temperature, into the upper region of the crystallization chamber 2 is welded to the upper portion of the housing 1. The casing 24 is provided with connecting elements 25 via which it is in communication with a blower or other device for forcing the cooling gas therein.

The wall 4 of the housing 1 which faces the casing 24 is provided with triangular openings 26 while the wall of the casing 24 which faces the housing 1 is similarly provided with triangular openings 27. The openings 26 in the housing 1 register with the openings 27 in the casing 24 so that the interior of the casing 24 is in communication with the crystallization chamber 2. Each of the openings 26 in the housing 1 is positioned below a hollow, profiled member 28 having the configuration of a ridged or saddled roof. Each of the profiled members 28 is fastened at one of its ends to the wall 4 of the housing 1 which is provided with the openings 26 and at the other of its ends to the opposite wall 4 of the housing 1. The profiled members 28 serve as distributors for distributing the cooling gas uniformly over the cross-section of the crystallization chamber 2.

The crystallization apparatus of FIG. 1 functions as follows:

During operation, the amorphous granular synthetic resin, which in the present description is assumed to be granular polyester, is continuously admitted into the crystallization chamber 2 via the feed pipe 6. The granular resin spreads out in the chamber 2 in correspondence with the angle of divergence of the walls 4 of the housing 1 and forms a column in the chamber 2. Under the influence of gravity, the granular resin streams around and between the hollow, profiled members 28 in the crystallization chamber 2 and descends through the latter towards the crystallization zone 3. At the same time hot gas enters the housing 1 from the supply casing 19 via the openings 22 in the latter and the openings 21 in the material outlet 8. The hot gas may, for example, have a temperature of approximately 150° to 180° C. The hot gas is distributed over the cross-section of the housing 1 by means of the hollow, profiled members 23, thereafter passes through the perforate plates 10 and 11, and finally enters the crystallization chamber 2. In the crystallization chamber 2, the hot gas counterflows from bottom to top and comes into contact with the granular resin which moves from bottom to top. The granular resin is first preheated by the hot gas before entering the crystallization zone 3. In the region of the crystallization zone 3, the granular resin is heated to its transition temperature, e.g. about 135° to 145° C., and undergoes a structural transformation from the amorphous to the crystalline state.

As the granular resin, which is now in crystalline form, continues to move downwardly, it enters the working region of the perforate plates 10 and 11. The plate 11 moves back and forth and, during this motion, engages any clumps which have formed in the crystallization zone 3 within the column of granular resin by adhesion of the particles of the granular resin to one another or by baking together of the particles. Such clumps are always formed when processing underwater granular materials which have a very strong tendency to form clumps. The clumps within the column are engaged by the edges of the perforations 13 provided in the plate 11 and the latter breaks down the clumps into individual resin particles. Since the adhesion of the resin particles is restricted to their peripheries, and no melting of the particles takes place, the clumps break down very readily under the action of the plate 11.

The individual resin particles flow through the perforations 13 of the upper plate 11 and the perforations 12 of the lower plate 10 into the material outlet 8. Subsequently, the particles flow through the outlet opening provided in the material outlet 8 and into the bucket wheel valve 9. The latter may, for instance, feed the particles to a conveyor which removes the particles from the vicinity of the housing 1.

The abrasive device which, in the embodiment here, is in the form of a pair of grate-like elements, or in the form of a pair of perforate plates 10 and 11, thus constantly insures that the crystalline material does not block or clog the crystallization apparatus, and does not affect the continuity of the supply of granular resin to the crystallization apparatus, in the event that clumps or agglomerates form in the crystallization zone 3. Accordingly, a steady stream of flowable material in the form of individual particles is discharged at the material outlet opening of the crystallization apparatus.

The hot gas in passing through the column of granular resin, gives up the major part of its heat content. The thus-cooled gas flows out of the top of column and leaves the crystallization chamber 2 via the exhaust pipe 7. The temperature of the gas upon leaving the crystallization chamber 2 may, for example, be or the order of 30° to 40° C. Subsequent to leaving the crystallization chamber 2, the gas is conveyed back towards the supply casing 19 and, after being reheated, is recycled into the latter for reintroduction into the crystallization chamber 2 via the hollow, profiled members 23. The gas may be conveyed from the exhaust pipe 7 towards the casing 19 by the same device, e.g. a blower, as is used to force hot gas into the casing 19.

At times it may be necessary or desirable to operate at a lower production rate, with a reduced throughput of granular resin, while leaving the gas supply unchanged. In such an event, the crystallization zone 3 tends to expand upwardly and the particles of the granular resin tend to bake onto the feed pipe 6 or to bake together and clog the feed pipe 6. To prevent this, the device, e.g. a blower, which is provided for admitting cooling air into the supply casing 24 is activated so that cooling air enters the latter. The cooling air flows through the openings 27 in the casing 24 and the openings 26 in the housing 1 into the crystallization chamber 2. The cooling air enters the chamber 2 below the hollow, profiled members 28 and is distributed uniformly over the entire cross-section of the crystallization chamber 2 by the members 28. The cooling air mixes immediately with the upwardly flowing hot gas in the vicinity of the members 28. As a result, the temperature of the hot gas which may, for example, be of the order of 100° C. here, is reduced to such an extent that the temperature of the granular resin in the critical region above the hollow, profiled members 28 remains below the glass point, e.g. below 85° C. In this manner, agglomeration of the particles of the granular resin and the formation of baked deposits by the particles in this critical region, which phenomena would normally accompany operation at reduced production rates, i.e. at decreased throughput of granular resin, may be reliably prevented.

Figure 2:
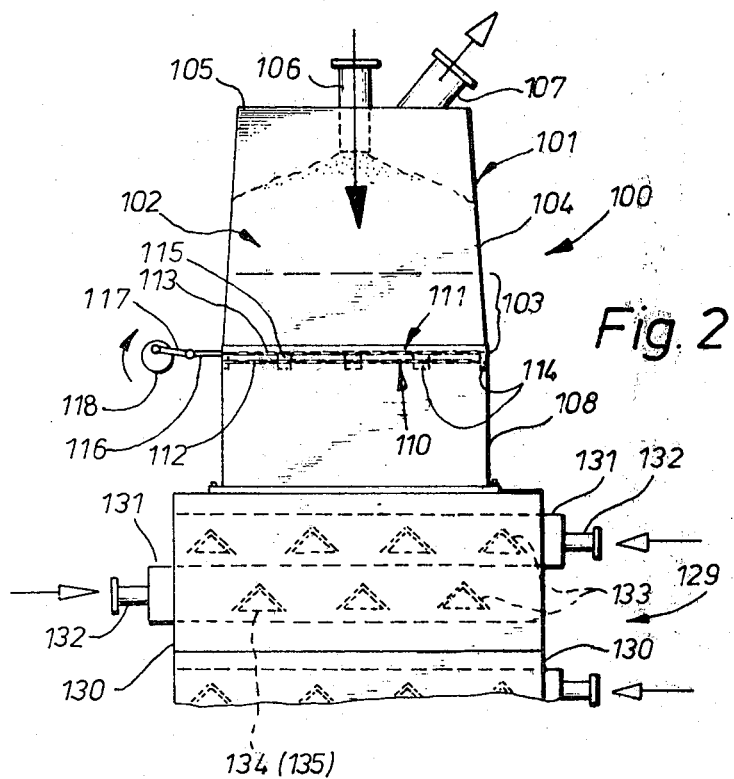
FIG. 2 schematically illustrates another embodiment of the crystallization apparatus according to the invention in combination with a shaft dryer.
Figure 3:
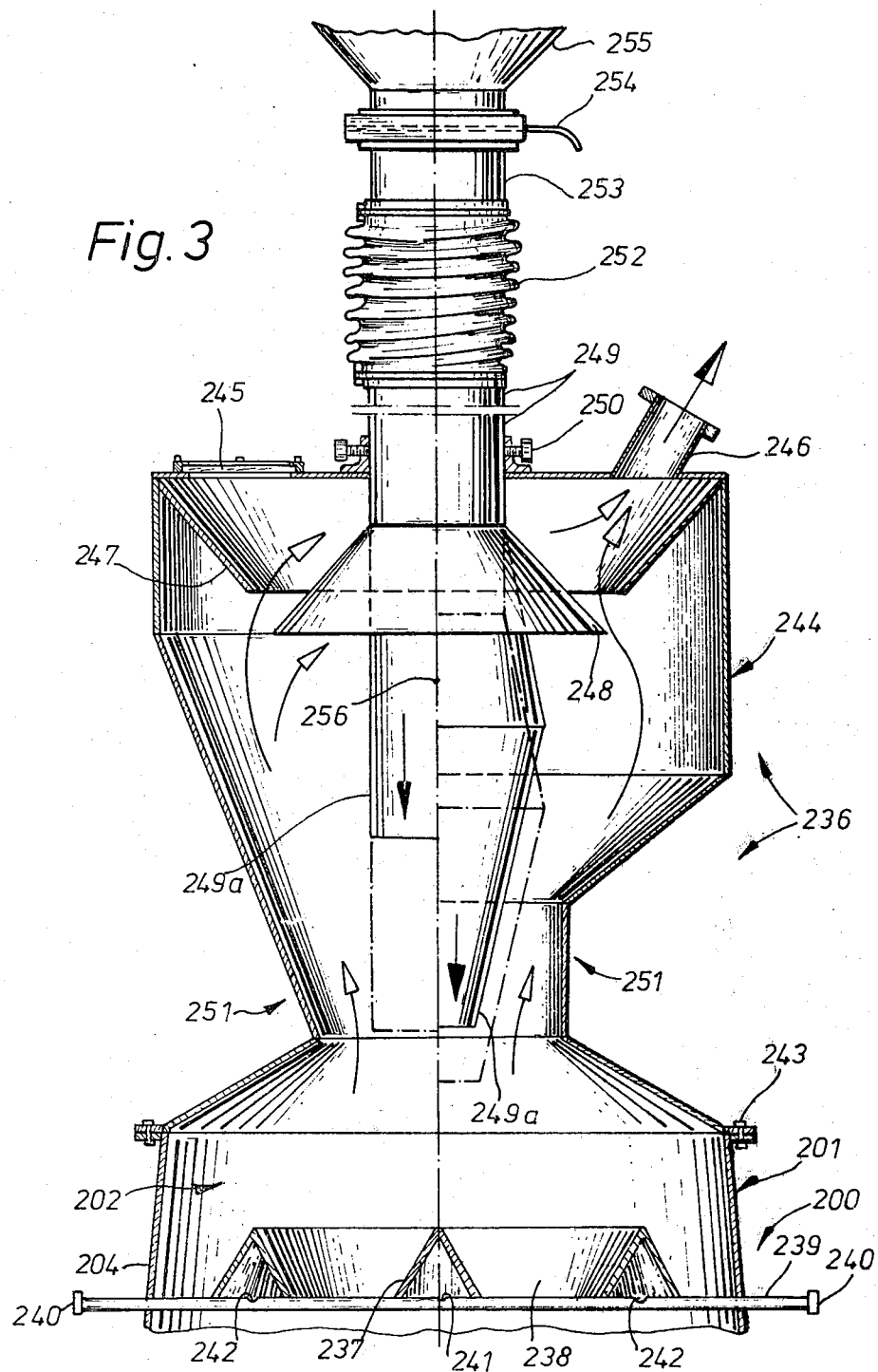

Referring now to FIG. 2, it may be seen that this illustrates a crystallization apparatus 100 and a shaft dryer 129. The crystallization apparatus 100, which is positioned directly upon the shaft dryer 129, is in principle constructed in the same manner as the crystallization apparatus of FIG. 1. The crystallization apparatus 100 has a housing 101 having side walls 104 and a top wall or cover 105. The housing 101 defines a crystallization chamber 102 having a crystallization zone 103. A feed pipe 106 for granular resin is provided in the top wall 105 as is an exhaust pipe 107 for the hot gas. A material outlet 108 is provided at the bottom of the housing 101.

The crystallization apparatus 100 further includes a lower, stationary plate 110 provided with perforations 112 and an upper movable plate 111 provided with perforations 113. The stationary perforate plate 110 rests on profiled supports 114 whereas the movable perforate plate 111 is arranged for back and forth movement on profiled supports 115. An eccentric drive is provided for imparting translational motion to the movable plate 111 and comprises a rod 116 connected with the plate 111, an eccentric lever 117, an eccentric disc or cam 118 and a non-illustrated motor.

In contrast to the embodiment of FIG. 1 where the material outlet 8 has a funnel-like or conical configuration, the material outlet 108 of the crystallization apparatus 100 of FIG. 2 is cylindrical. The material outlet 108 also functions as a material inlet for the shaft dryer 129.

As is conventional, the shaft dryer 129 has a plurality of drying sections 130 which are arranged one above the other. A supply casing 131 is associated with each of the drying sections 130 for the purpose of supplying hot gas, e.g. hot air, to the respective drying section 130. The supply casings 131 are provided with connecting devices 132 in order that communication with a source of hot gas may be established.

Hollow, profiled members 133 having the configuration of a ridged or saddle roof are provided in each of the drying sections 130. The members 133 function as distributors to distribute the hot gas entering the respective drying sections 130 uniformly over the entire cross-section of the shaft dryer 129 and its drying sections 130.

An opening 134 is provided below each of the hollow, profiled members 133 in that wall of each drying sectin 130 which faces the associated supply casing 131. Similarly, each supply casing 131 is provided with openings 135 in that one of its walls which is adjacent the associated drying section 130. The openings 135 in the supply casings 131 have the same shape and size as the openings 134 in the drying sections 130 and each of the openings 135 registers with one of the openings 134. In this fashion, communication is established between the interiors of the supply casings 131 and the interiors of the respective drying sections 130.

Contrary to the embodiment of FIG. 1, the crystallization apparatus 100 of FIG. 2 has neither its own hot gas supply nor its own distributors for the hot gas. Instead, the crystallization apparatus 100 is supplied with hot gas in that the upwardly flowing hot gas in the shaft dryer 129 is permitted to enter the crystallization apparatus 100. Thus, the upwardly flowing hot gas in the shaft dryer 129 passes through the uppermost drying section 130 of the latter into the cylindrical material outlet 108 of the crystallization apparatus 100. From the material outlet 108, the hot gas flows through the perforate plates 110 and 111 into the crystallization chamber 102.

Supply means and distributing means for the introduction of a cooling gas into the region above the crystallization zone 103 have not been shown here for the sake of simplicity. However, such means may be provided and may have the construction illustrated in FIG. 1.

The mode of operation of the crystallization apparatus 100 is the same as that described for the embodiment of FIG. 1. With respect to the shaft dryer 129, the function and construction thereof are within the state of the art.

The advance achieved with the crystallization method and apparatus of the invention resides largely in that it is now possible to process underwater granular materials. The crystallization method and apparatus also permit continuous operation to be achieved. Other advantages of the crystallization method and apparatus stem from the very economical construction of the apparatus and from the suitability of the method and apparatus for increased and high production rates. An additional advantage of the crystallization method and apparatus resides in that particularly good energy utilization may be achieved since the hot gas may undergo cooling almost to room temperature during the process.

It will be understood that each of the elements described above, or two or more together, may also find a useful application in other types of elements and operations, differing from the types described above.

While the invention has been illustrated and described as embodied in methods and apparatus for crystallizing and removing fines from granular synthetic resins, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for homogeneously crystallizing a continuous flow of an amorphorous gravity fed substance which is in particle form, such as granular polyester and the like, by directly subjecting the substance to a counterflow of hot gas and thereby heating the substance to a transition temperature at which the substance undergoes a transformation to a crystalline state in a crystallizing zone in which clumps are formed, and by grinding such clumps after their formation to produce a continuous flow of crystallized substance in ground-up form, comprising: a vertically elongated hollow housing with a top, a bottom, a feed port, an outlet port, a hot gas intake, a cool gas intake, a gas exhaust, and an interior, the feed port being located at the top of the housing to permit an amorphorous substance to enter the interior of the housing under the influence of gravity, the outlet port being located at the bottom of the housing to permit the substance to be withdrawn from the interior of the housing under the influence of gravity after crystallization, with the path traversed between the ports by the substance defining a processing flow path extending downwardly through the interior of the housing and passing through a zone thereof which is a crystallization zone having an upper boundry and a lower boundry, which is located intermediate the ports, the hot gas intake being attached to the housing intermediate the crystallization zone and the outlet port, the cool gas intake being attached to the housing intermediate the crystallization zone and the feed port, and the gas exhaust being located on the top of the housing adjacent the feed port, whereby a hot gas flow path and a cool gas flow path are defined, the hot gas flow path passing entirely through the crystallization zone from the hot gas intake to the gas exhaust and the cool gas flow path passing from the cool gas intake to the exhaust entirely above the crystallization zone, the gas flow paths extending upwardly through the interior of the housing in a direction opposed to the direction of the processing flow path and in directly subjected counterflow thereto; a cool gas distributor communicating with the cool gas intake and located within the housing intermediate the crystallization zone and the feed port, the cool gas distributor operating in a manner that cool gas entering the cool gas intake is distributed uniformly within the interior of the housing; and grinding means located within the housing above the hot gas distributor and adjoining only the lower boundry of the crystallization zone and operating in such a manner as to grind clumps formed therein and wherein the grinding means includes at least one perforated plate transversely intersecting the entire flow path and wherein the grinding means includes two horizontal perforated plates which are parallel to each other in vertically separated planes and movable with respect to one another and wherein one plate is fixed and another plate is moveable in its plane and wherein the housing extending outwardly and downwardly intermediate the feed port and the grinding means, and has a maximal cross-sectional area at the location of the grinding means.

2. The device defined by claim 1, wherein the hot gas distributor includes hollow saddle-shaped profiled members.

3. The device defined by claim 1, wherein the cool gas distributor includes hollow saddle-shaped profiled members.

* * * * *